United States Patent
Bool et al.

(10) Patent No.: US 9,091,430 B2
(45) Date of Patent: Jul. 28, 2015

(54) STABILIZING COMBUSTION OF OXYGEN AND FLUE GAS

(75) Inventors: Lawrence Bool, East Aurora, NY (US); Stefan E. F. Laux, Williamsville, NY (US); Kelly Fangmei Tian, Williamsville, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 437 days.

(21) Appl. No.: 13/592,058

(22) Filed: Aug. 22, 2012

(65) Prior Publication Data

US 2013/0047900 A1   Feb. 28, 2013

Related U.S. Application Data

(60) Provisional application No. 61/528,961, filed on Aug. 30, 2011.

(51) Int. Cl.
| F23J 7/00 | (2006.01) |
|---|---|
| F23C 9/00 | (2006.01) |
| F23L 7/00 | (2006.01) |
| F23D 14/22 | (2006.01) |
| F23D 14/32 | (2006.01) |
| F23D 23/00 | (2006.01) |

(52) U.S. Cl.
CPC . *F23C 9/00* (2013.01); *F23D 14/22* (2013.01); *F23D 14/32* (2013.01); *F23D 23/00* (2013.01); *F23L 7/007* (2013.01); *Y02E 20/322* (2013.01); *Y02E 20/344* (2013.01)

(58) Field of Classification Search
CPC .......... F23C 9/00; F23D 23/00; F23D 14/22; F23D 14/32; F23L 7/007; Y02E 20/322; Y02E 20/344
See application file for complete search history.

(56) References Cited

U.S. PATENT DOCUMENTS 5,997,292 A * 12/1999 Tanaka et al. ................. 432/181

* cited by examiner

*Primary Examiner* — Alfred Basichas
(74) *Attorney, Agent, or Firm* — Donald T. Black

(57) ABSTRACT

Flame stability of a burner that is operated with a mixture of oxygen and flue gas as the oxidant, is enhanced by including a second burner that combusts fuel with oxidant having a high $O_2$ content.

5 Claims, 1 Drawing Sheet

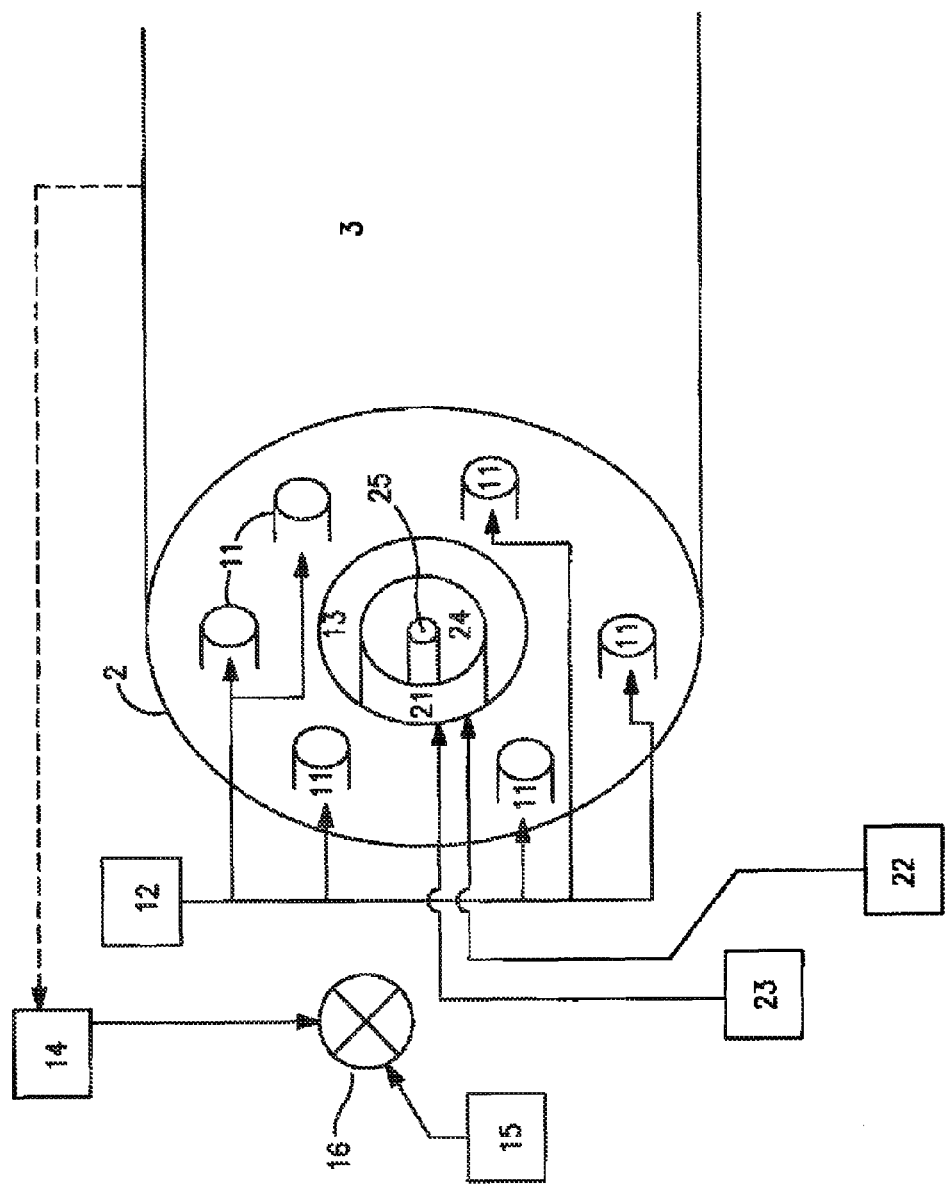

STABILIZING COMBUSTION OF OXYGEN AND FLUE GAS

This application claims priority from U.S. provisional application Ser. No. 61/528,961, filed Aug. 30, 2011, the disclosure of which is hereby incorporated herein by reference.

FIELD OF THE INVENTION

The present invention relates to improving the operation and reliability of burners in which gaseous fuel is combusted with oxidant comprising oxygen and flue gas, such as recirculated flue gas.

BACKGROUND OF THE INVENTION

Combustion systems that operate with a mixture of oxygen and recirculated flue gas as the oxidant that combusts with the fuel, are currently in development to facilitate the generation of carbon dioxide in concentrations that make recovery and isolation of the carbon dioxide more feasible. Such systems, often referred to as oxy-fuel combustion systems, typically include a burner to combust the fuel gas with oxygen that also contains recirculated flue gas. A flue gas recirculation loop and control systems are included, for providing fuel gas and oxygen and gaseous products of the combustion back to the burner to adjust the furnace heat transfer to levels similar to air combustion.

Ultra-low NOx gas burners, often referred to as "premixed" burners, are optimized to provide very low NOx emissions from their use in industrial gas boilers. These burners use multiple gas nozzles through which the fuel gas is fed, to facilitate premixing of the fuel gas into the combustion air (i.e., the air that is the source of the oxygen that combusts with the fuel gas) to distribute the fuel more evenly into the combustion air. This more diluted fuel gas results in a more even heat release upon combustion, leading to lower thermal NOx emission from the flame. However, the ignition stability and flame stability of such burners is a challenge, so the burners provide adjustability for fuel and combustion air to achieve the best possible flame stability and NOx emissions.

The present inventors have determined that when a premixed ultra-low NOx gas burner is operated with a mixture of oxygen and recirculated flue gas as the gaseous oxidant, the system may experience flame instability and potential flame failure. This would lead to unfavorable operation conditions and presents a serious safety risk.

BRIEF SUMMARY OF THE INVENTION

One aspect of the present invention is a burner apparatus comprising (a) a first burner comprising (1) a plurality of fuel nozzles, operatively connected to at least one source of gaseous fuel; and (2) at least one oxidant nozzle operatively connected to a source of first gaseous oxidant that comprises a mixture of oxygen and flue gas, and to a source of second gaseous oxidant (which is preferably air) that is different in composition from said first gaseous oxidant, in a manner that permits control of whether oxidant fed to said at least one oxidant nozzle is said first gaseous oxidant or said second gaseous oxidant or a mixture thereof; and (b) a second burner comprising (1) at least one fuel nozzle; and (2) at least one oxidant nozzle, operatively connected to a source of second gaseous oxidant comprising at least 21 vol. % oxygen, wherein said second burner is positioned relative to said first burner so that combustion at said second burner heats first gaseous oxidant that emerges from said at least one oxidant nozzle of said first burner;

wherein said second burner can be firing or not firing while said first burner is firing.

Another aspect of the present invention is a method of improving the operation of a burner, comprising (a) feeding gaseous fuel, and first gaseous oxidant comprising a mixture of oxygen and flue gas, to a first burner comprising a plurality of fuel nozzles that are operatively connected to at least one source of said gaseous fuel, and combusting said gaseous fuel and said first gaseous oxidant that emerge from said first burner; and (b) combusting gaseous fuel and second gaseous oxidant comprising at least 21 vol. % oxygen at a second burner to heat first gaseous oxidant that emerges from said first burner. Here too, the preferred second gaseous oxidant is air.

BRIEF DESCRIPTION OF THE DRAWINGS

FIG. 1 is a schematic flowsheet of a combustion system embodying the burner apparatus of the present invention.

DETAILED DESCRIPTION OF THE INVENTION

The present invention is particularly useful with burners that contain more than one nozzle through which fuel gas is fed, so that the fuel gas is premixed, that is, prior to combustion of the fuel gas it is mixed with the gaseous oxidant (such as combustion air, or mixture of oxygen and flue gas) with which the fuel gas is to be combusted. This mixing or premixing serves to dilute the fuel gas in the gaseous oxidant, so that the combustion forms less thermal NOx than would be the case if the fuel gas is fed in only one location where it is combined and combusted with the gaseous oxidant.

One such burner 2 is illustrated in FIG. 1. Burner 2 is located at one end of combustion chamber 3. Burner 2 includes a plurality of nozzles 11 for emitting gaseous fuel. Each nozzle 11 is connected to a source 12 of gaseous fuel. Suitable fuel is any combustible gaseous composition. Examples include refinery offgas, coke oven gas, gasified LPG, gaseous hydrocarbons (including alkanes, alkenes, alkynes, and alcohols), and mixtures of any of the foregoing. Preferred fuels include natural gas and methane. These can be obtained from commercial sources, from wells, or from another industrial process.

Burner 2 also has at least one nozzle 13 for emitting gaseous oxidant that is to be combusted in the burner with the gaseous fuel. Nozzle 13 is connected to a source 14 of first gaseous oxidant, and to a source 15 of second gaseous oxidant which is different in composition from source 14. In the preferred embodiments of this invention, the first gaseous oxidant is a mixture of oxygen and flue gas (by which is meant gaseous products of combustion, whether the combustion occurred at the same burner 2 in combustion chamber 3 or elsewhere, and comprising at least carbon dioxide). The oxygen that is mixed with flue gas to form this preferred first gaseous oxidant is preferably at least 80 vol. % and more preferably at least 90 vol. % $O_2$, and the oxygen content of the resulting mixture will generally be in the range of 18 vol. % $O_2$ to 23 vol. % $O_2$.

When flue gas that is incorporated in the first gaseous oxidant has been formed by combustion at burner 2, typically 70% to 85% of the flue gas that is formed in such combustion is recycled to burner 2.

The preferred second gaseous oxidant is air. Other second gaseous oxidants include other mixtures of $O_2$ with flue gas, or oxygen-enriched air containing 20 vol. % $O_2$ to 80 vol. % $O_2$.

Burner 2 is typically of a capacity that can fire at a rate of 30 to 300 MMBtu/hour.

Also present is apparatus 16 that controls whether the gaseous oxidant that is fed to nozzle 13 is the first gaseous oxidant or the second gaseous oxidant. Preferably, apparatus 16 includes the ability to provide a mixture of the first and second gaseous oxidants to nozzle 13, so long as it is possible to feed either the first or the second gaseous oxidant. Apparatus 13 can comprise valves that open or close the lines that feed the gaseous oxidants, together with electric or mechanical controls that enable an operator to open and close each valve.

A second burner 21 is also provided. It is situated with respect to burner 2 so that combustion of fuel and oxidant at burner 21 heats the gaseous oxidant that is fed through nozzle 13 of burner 2. Preferably, burner 21 is located in the center of nozzle 13. Burner 21 is connected to a source 22 of gaseous fuel, which as described above with respect to burner 2 is a combustible gaseous composition and is preferably natural gas or methane. Burner 21 is also connected to a source 23 of second gaseous oxidant for second burner 21. The second gaseous oxidant should have a $O_2$ content of at least 21 vol. % $O_2$ and preferably at least 90 vol. % $O_2$. Oxidants having this high an $O_2$ content can be formed by mixing air or flue gas with oxygen in its commercially available form having an oxygen content on the order of 99 vol. % $O_2$.

Second burner 21 can comprise a tube 24 through which oxygen is fed, surrounding a tube 25 through which the fuel is fed.

In operation, the burner 2 can be operated as an air-fuel burner, in which the gaseous fuel and air as the aforementioned "second gaseous oxidant" are fed to burner 2 and combusted, and burner 21 is not operated. Alternatively, the gaseous oxidant that is fed to burner 2 is switched to be a mixture of $O_2$ and flue gas (preferably recirculated flue gas that was formed by combustion at burner 2), and this oxidant and gaseous fuel are fed to burner 2 and combusted there, while burner 21 is also operated to combust gaseous fuel and the aforementioned second gaseous oxidant.

The burner 21 is preferably scaled so that its maximum energy output capacity is up to 10%, preferably 2% to 5%, of the maximum energy output capacity of burner 2.

Preferably the relative amounts of fuel and $O_2$ fed to burners 2 and 21, when both of said burners are firing, should be sufficient to establish a slight excess of oxygen, so that the oxygen content in the combustion products is in the range of 0.5 vol. % to 2 vol. % $O_2$ (wet basis) and preferably about 1 vol. % $O_2$.

Example

Combustion was analyzed with computational fluid dynamics applied to a simulated cylindrical furnace in which combustion was simulated using a burner such as burner 2, using air or a mixture of $O_2$ and flue gas (total $O_2$ content 19 vol. %) as the gaseous oxidant, without operation of oxy-fuel burner 21, and with operation of burners 2 and 21 together.

Comparison of the temperature profiles generated for combustion using burner 2 and not burner 21, using air as the combustion oxidant, and using the mixture of $O_2$ and flue gas as the combustion oxidant, showed that when the mixture of $O_2$ and flue gas was the oxidant ignition, ignition was significantly delayed and the combustion temperatures in the flame were significantly lower. This is an indication that the flame in a real furnace under these conditions is likely to be unstable and to blow off from the burner, or that ignition might not even occur.

Computational fluid dynamic analysis of the same combustion conditions and assumed burner apparatus, in which the burner 2 was fed the mixture of $O_2$ and flue gas as the gaseous oxidant, but also including an oxy-fuel ($O_2$ content in the oxidant was 97 vol. %) burner, in the center of the larger burner 2, firing at 3% of the capacity of the burner 2 capacity, showed early ignition and heating of the $O_2$/flue gas stream entering the furnace through burner 2, and showed improved ignition of the rest of the natural gas injected into the $O_2$/flue gas mixture. Analysis showed good flame attachment and high flame temperatures near the burner, which are required to achieve attachment of the flame to the burner.

Comparison of the average temperature along the boiler length shows that the operation with a mixture of oxygen and flue gas and with the small oxy-fuel burner in the center of the larger burner can achieve the steep temperature increase that is provided by operation of the burner 2 alone with air as the gaseous oxidant.

Analysis of the oxygen concentrations indicated that in the baseline air case there were relatively high oxygen concentrations near the front wall as air exits from the burner. Most of the air is injected close to the burner axis, mixed with fuel and used in the combustion process. The $O_2$/flue gas operation with the small oxy-fuel burner 21 in the center of burner 2 leads to a region of high oxygen content close to the burner 2, until the combustion reaction starts with the help of oxy-fuel burner 21 and this oxygen is consumed. A large region on the furnace axis is then depleted of oxygen, which helps minimize NOx emissions of the combustion.

Average NOx emissions were lower with combustion using the mixture of $O_2$ and flue gas, together with operation of the small oxy-fuel burner 21 in the center of burner 2, when the NOx emission were considered on a volumetric basis and on a total mass basis.

What is claimed is:

1. A method of improving the operation of a burner, comprising
   (a) feeding gaseous fuel, and first gaseous oxidant comprising a mixture of oxygen and flue gas, to a first burner comprising a plurality of fuel nozzles that are operatively connected to at least one source of said gaseous fuel, and combusting said gaseous fuel and said first gaseous oxidant that emerge from said first burner, wherein the flue gas is gaseous products of combustion that occurred at the first burner; and
   (b) combusting gaseous fuel and second gaseous oxidant comprising at least 21 vol. % oxygen at a second burner to heat first gaseous oxidant that emerges from said first burner.

2. A method according to claim 1 wherein the maximum energy output capacity of said second burner is up to 10% of the maximum energy output capacity of said first burner.

3. A burner apparatus comprising
   (a) a first burner comprising (1) a plurality of fuel nozzles, operatively connected to at least one source of gaseous fuel; and (2) at least one oxidant nozzle operatively connected to a source of first gaseous oxidant that comprises a mixture of oxygen and flue gas wherein the flue gas is gaseous products of combustion that occurred at the first burner, and to a source of second gaseous oxidant different in composition from said first gaseous oxidant, in a manner that permits control of whether oxidant fed to said at least one oxidant nozzle is said first gaseous oxidant or said second gaseous oxidant or a mixture of said first and second oxidants; and (b) a second burner comprising (1) at least one fuel nozzle; and (2) at least one oxidant nozzle, operatively connected to a source of second gaseous oxidant comprising at least 21 vol. % oxygen, wherein said second burner is positioned relative to said first burner so that combustion at said second burner heats first gaseous oxidant that emerges from said at least one oxidant nozzle of said first burner;

wherein said second burner can be firing or not firing while said first burner is firing.

4. A burner apparatus according to claim 3 wherein said second gaseous oxidant is air.

5. A burner apparatus according to claim 3 wherein the maximum energy output capacity of said second burner is up to 10% of the maximum energy output capacity of said first burner.

\* \* \* \* \*